United States Patent
Kobayashi et al.

(10) Patent No.: US 6,521,073 B1
(45) Date of Patent: Feb. 18, 2003

(54) PROCESS FOR PRODUCING MULTILAYER MOLDED ARTICLE

(75) Inventors: Yoshitaka Kobayashi, Ibaraki (JP); Nobuhiro Usui, Takatsuki (JP); Takeo Kitayama, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/560,403

(22) Filed: Apr. 28, 2000

(30) Foreign Application Priority Data

Apr. 30, 1999 (JP) .......................... 11-124528

(51) Int. Cl.[7] .............................. B29C 45/16
(52) U.S. Cl. .............. 156/242; 156/245; 264/241; 264/257; 264/328.1
(58) Field of Search .................. 156/242, 243, 156/244.11, 244.25, 244.26, 244.27, 245, 285; 264/478, 46.4, 46.6, 241, 250, 225, 257, 259, 266, DIG. 77, 328.1; 428/315.9, 318.4, 318.6, 318.8, 319.1, 319.3, 319.7

(56) References Cited

U.S. PATENT DOCUMENTS 5,395,580 A * 3/1995 Morita et al. ............... 264/266
5,543,094 A * 8/1996 Hara et al. .................. 264/46.4
5,672,403 A    9/1997 Hara et al.

OTHER PUBLICATIONS

Patent Abstract of JP–S60–212342–A.

Patent Abstract of JP–S61–14944–A.

* cited by examiner

Primary Examiner—Michael W. Ball
Assistant Examiner—Jessica Rossi
(74) Attorney, Agent, or Firm—Fitch, Even, Tabin & Flannery

(57) ABSTRACT

The present invention provides a process for producing a multilayer molded article having a skin material laminated with at least a part of the surface of a substrate formed of a thermoplastic resin. The process has steps of supplying a skin material to between a pair of mold halves and supplying a molten thermoplastic resin to between the skin material and the molding surface of one of the mold halves. The process uses, as the skin material, a skin material which has at least a foamed urethane layer and a nonfoamed backing layer wherein the product of the density, $\rho$ ($g/cm^3$), of the foamed urethane layer and the weight, $W$ ($g/m^2$), of the backing layer is not less than 2. This process prevents crush of the foamed urethane layer and can produce a multilayer molded article with good appearance.

10 Claims, 2 Drawing Sheets

PROCESS FOR PRODUCING MULTILAYER MOLDED ARTICLE

BACKGROUND OF THE INVENTION

1. Field of the Invention

The present invention relates to a process for producing a multilayer molded article having a skin material laminated with at least a part of the surface of a substrate formed of a thermoplastic resin, etc.

2. Description of the Related Art

Multilayer molded articles in which a skin material having a foamed layer is laminated in one piece to the surface of a substrate formed of a thermoplastic resin have been widely used in many fields such as interior parts of automobiles (for example, door trims and instrument panels), interior and exterior parts of household appliances, and the like.

Hitherto, as a manufacturing process of such multilayer molded articles have been known, for example, a process comprising laminating and adhering a skin material, by using adhesive or the like, to a substrate produced in advance by variety of methods such as injection molding and compression molding and a process comprising supplying a skin material to between a pair of mold halves and thereafter supplying a molten thermoplastic resin, thereby giving a desired shape to the molten resin to form a substrate and simultaneously laminating the skin material in one piece to the surface of the substrate.

However, among such processes, the former process has complex steps and also has problems on the human body, the environment and the like caused by a solvent contained in the adhesive. The latter process has an advantage of being capable of forming a substrate and simultaneously laminating a skin material onto the surface of the substrate, but also has a problem that when a molten thermoplastic resin of high temperature and high pressure is supplied into a mold, the high pressure molten resin comes in contact with a skin material and the skin material is pressed against a molding surface, and as a result, feeling of the resulting skin material is damaged. In particular, there has been a problem that when a skin material having a foamed layer is used, the foamed layer is crushed and cushion property is deteriorated.

In particular, in the case of a skin material having a foamed urethane layer as a foamed layer, the foamed layer is noticeably crushed. A known measure against this problem is to back the foamed layer. However, no attention heretofore has been directed to a relationship between the density of the foamed urethane layer and the weight of the backing layer at all, and the backing layer has been made as thin as possible. There therefore has been a problem that the foamed layer can not be fully protected.

SUMMARY OF THE INVENTION

Under these circumstances, in order to produce a multilayer molded article at low cost with taking advantage of the benefit of injection molding, compression molding or the like of being capable of forming a substrate and simultaneously laminating a skin material onto the surface of the substrate, even in the case of using a skin material having a foamed urethane layer, without impairment of the cushion property caused by crush of the foamed layer, the present inventors have found that a relationship between the density $\rho$ of the foamed urethane layer and the weight W of a backing layer is very important. As a result, they have accomplished the present invention.

That is, the present invention provides:

a process for producing a multilayer molded article having a skin material laminated with at least a part of the surface of a substrate formed of a thermoplastic resin, the process comprising supplying a skin material to between a pair of mold halves and supplying a molten thermoplastic resin to between the skin material and the molding surface of one of the mold halves, the process being characterized by using, as the skin material, a skin material which has at least a foamed urethane layer and a nonfoamed backing layer wherein the product of the density, $\rho$ (g/cm$^3$), of the foamed urethane layer and the weight, W (g/m$^2$), of the backing layer is not less than 2; and a method for controlling crush of a foamed urethane layer in a multilayer molded article having a skin material with the foamed urethane layer, the skin material being laminated with at least a part of the surface of a substrate formed of a thermoplastic resin, the method being characterized by laminating such a backing layer that the product of the density, $\rho$ (g/cm$^3$), of the foamed urethane layer and the weight, W (g/m$^2$), of the backing layer is not less than 2 to the foamed urethane layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE PREFERRED EMBODIMENTS

Figure 1:
FIG. 1 illustrate an example of a skin material to be applied to the present invention by using a section thereof.

The process and the method of the present invention are described below.

The process of the present invention may be any process as long as it can produce a multilayer molded article by supplying a skin material to between a pair of mold halves and supplying a molten thermoplastic resin to between the skin material and one of the molding surface of one of the mold halves, thereby laminating the skin material onto at least a part of the surface of a substrate formed of the thermoplastic resin. It therefore has no limitations in its procedures themselves, but it is important to use, as a skin material, a skin material which has at least a foamed urethane layer and a nonfoamed backing layer wherein the product of the density, $\rho$ (g/cm$^3$), of the foamed urethane layer and the weight, W (g/m$^2$), of the backing layer is not less than 2.

In general, soft or semi-rigid polyurethane foams are used as the foamed urethane layer to be used in such a skin material.

Although the foamed urethane layer is not particularly restricted in its density and thickness and may be any one in these respects, ones having a density of from 0.02 to 0.08 g/cm$^3$ are preferably employed, in general.

As the backing layer, nonfoamed nonwoven fabric, sheets and films formed of synthetic resin, and the like may be used. It is undesirable that the backing layer is foamed because the foamed backing layer itself is crushed by heat and pressure and the foamed urethane layer is seriously affected.

Examples of fibers to form the nonwoven fabric include natural fibers such as cotton, wool, silk and hemp, and synthetic fibers such as polyamide, polyester and nylon. Nonwoven fabrics prepared by spinning these fibers alone or in combination and forming into nonwoven fabric may be used. Examples of such nonwoven fabrics include ones of needle punched type, thermal bond type, spunbond type, meltblown type and spunlace type.

The sheets and films of synthetic resin may be ones formed of a thermoplastic resin, such as polypropylene and polyethylene, or a polyolefinic thermoplastic elastomer. Materials are used which have weldability to the thermoplastic resin to be used as a resin of the substrate.

Such a backing layer generally contains one layer, but it may be composed of two or more layers as needed. In the latter case, the weight of the backing layer referred to in the present invention means the weight for the total thickness of the backing layer.

As for the skin material to be used in the present invention, it is important that the product of the density, $\rho$ (g/cm$^3$), of the foamed urethane layer and the weight, W (g/m$^2$), of the backing layer is not less than 2. In the use of a skin material is used, the foamed urethane layer and the backing layer are adequately selected and combined so as to meet the preceding requirement.

When the product of the density, $\rho$ (g/cm$^3$), of the foamed urethane layer and the weight, W (g/m$^2$), of the backing layer is less than 2, the foamed layer is easily crushed by heat or pressure applied at the time of supplying the molten thermoplastic resin, and as a result, cushion property of the resulting molded article is easily damaged or irregularity is formed in the surface of the product. Such a case therefore is undesirable.

The skin material to be used in the present invention essentially has the aforementioned foamed urethane layer and nonfoamed backing layer, and also may have further a skin layer composed of one layer or two or more layers as needed. In many cases, skin materials having three, or four or more layers including the skin layer, foamed urethane layer and backing layer are preferably used.

When a skin layer is used, the skin layer may be a woven or knit fabric such as moquette and tricot, a nonwoven fabric such as a needle punched carpet, a metal foil, a sheet or film of thermoplastic resin or thermoplastic elastomer.

As the thermoplastic resin to be applied to the present invention, any thermoplastic resin is applicable which has been conventionally employed in extrusion molding, injection molding, press molding and the like. Examples thereof include conventional thermoplastic resins such as polyethylene, polypropylene, acrylonitrile/styrene/butadiene copolymers, polystyrene, polyamide such as nylon, polyvinyl chloride, polycarbonate, acrylic resins and styrene/butadiene block copolymers, thermoplastic elastomers such as EPM and EPDM, mixtures thereof and polymer alloys using them. These materials may be either foamable or nonfoamable.

In such a thermoplastic resin, conventionally used reinforcing fibers such as glass fiber and a variety of fillers such as inorganic or organic fillers may be mixed as needed. Of course, also a variety of additives conventionally used, such as a pigment, a lubricant, an antistatic agent and a stabilizer, may be blended as appropriate.

As a molding method for producing the multilayer molded article of the present invention, an appropriate method such as injection molding and compression molding can be applied, and it is not particularly limited as long as it is a process comprising supplying a skin material to between a pair of mold halves and supplying a molten thermoplastic resin to between the skin material and one of the molding surface of one of the mold halves, thereby laminating the skin material to at least a part of the surface of a substrate formed of the thermoplastic resin. In the case of injection molding, the heat and pressure of the molten thermoplastic resin is directly applied to the skin material when the molten resin is supplied. This might give a serious damage to the skin material. Therefore, preferred is compression molding, which can reduce the damage to the skin material, wherein the mold halves are opened at the time of supplying the molten resin and mold clamping is conducted after or concurrently with the completion of supplying the molten resin.

The process for producing a multilayer molded article by compression molding, which is a representative manufacturing method, is explained below based on drawings.

Needless to say, the explanation only illustrates an example of the present invention and the invention is not restricted to this.

FIG. 1 shows, using a section, an example of a skin material (1) to be applied to the present invention, which is composed of a skin layer (2), a foamed urethane layer (3) and a backing layer (4). The foamed urethane layer and the backing layer are selected so that the product of the density $\rho$ (g/cm$^3$) and the weight W (g/m$^2$) becomes not less than 2. These layers are laminated by means of an adhesive or heat welding.

FIGS. 2–5 illustrate, using a schematic sectional view of the mold, manufacturing procedures of the multilayer molded article by the compression molding method.

Figure 2:
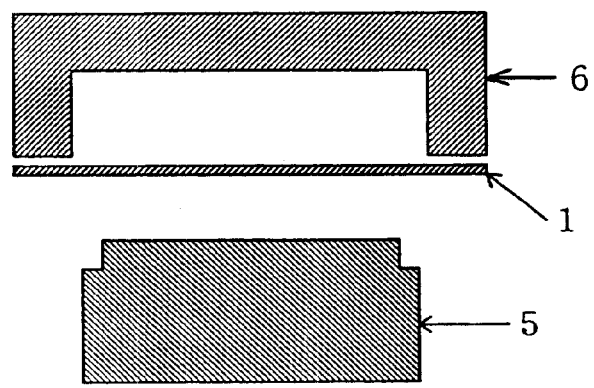
FIG. 2 illustrates a manufacturing step according to the present invention by using a schematic sectional view of a mold.

FIG. 2 shows the state where the skin material (1) has been supplied to between a pair of female and male mold halves (5, 6) in an open state.

The skin material may be merely placed on the molding surface of the male mold (5) and also may be fixed to the body of the male mold or female mold (6) or a skin material-fixing frame (not shown) provided around these mold halves with pins or the like.

In addition, the skin material may be used after preheating or preforming depending upon the shape of a product.

Figure 3:
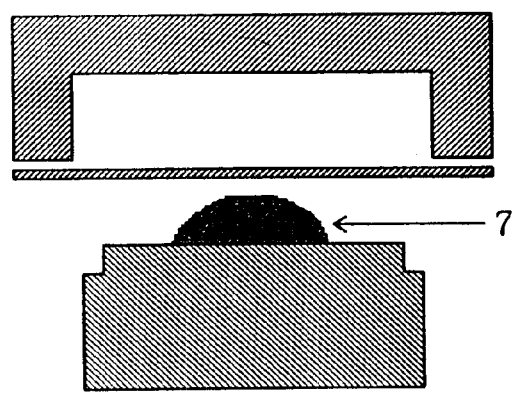
FIG. 3 illustrates a manufacturing step according to the present invention by using a schematic sectional view of a mold.

FIG. 3 shows the state where a molten thermoplastic resin (7) has been supplied to between the skin material supplied between the mold halves and the molding surface of the male mold (5).

The supply of the molten thermoplastic resin can be conducted by an arbitrary method such as a method wherein the resin is mechanically dispensed and placed to between the mold halves from an external supplying apparatus using a resin supplying arm or the like and a method wherein the resin is directly supplied into the set of the mold halves via a resin supplying passage provided in a mold (the male mold (5) in this figure) through a resin supplying opening provided in the molding surface of the mold. The latter is preferable because of its ease of controlling the molding action, and the like.

Figure 4:
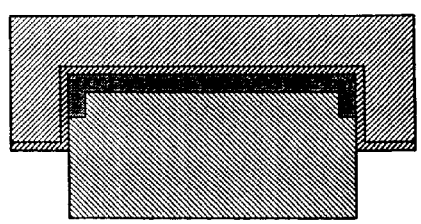
FIG. 4 illustrates a manufacturing step according to the present invention by using a schematic sectional view of a mold.
Figure 5:
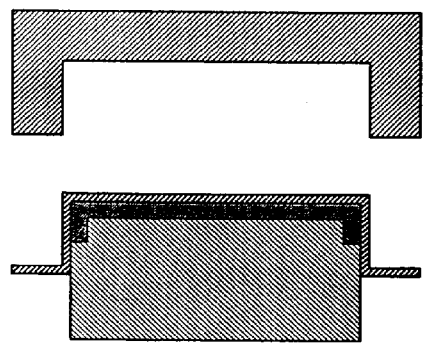
FIG. 5 illustrates a manufacturing step according to the present invention by using a schematic sectional view of a mold.

FIG. 4 shows the state where the female and male mold halves have been clamped after the supply of the molten thermoplastic resin. By this clamping step, the thermoplastic resin is shaped into a form of a substrate, and simultaneously the skin material is integrated with the substrate.

Although this figure illustrates an example in which the mold halves are clamped in a vertical direction, a clamping direction may be the vertical direction or a horizontal direction.

Furthermore, the mold clamping may be commenced after the supply of the molten resin, and it is also possible that the mold clamping is conducted concurrently with the completion of supplying the molten resin or in parallel with supplying the molten resin and the mold clamping is completed concurrently with or after the completion of supplying the molten resin.

Figure 6:
FIG. 6 illustrates an example of a multilayer molded article obtained according to the present invention, in the article a skin material being laminated onto the entire surface of a substrate.

When the mold clamping has completed, the molten resin is cooled to solidify. The mold halves are then opened (FIG. 5) and the molded article is taken out. By this can be obtained a multilayer molded article (8) in which the skin material is laminated in one piece onto the surface of the substrate of the thermoplastic resin as shown in FIG. 6.

Figure 7:
FIG. 7 illustrates an example of a multilayer molded article obtained according to the present invention, in the article a skin material being laminated onto a partial surface of a substrate.

Although the example in which the skin material is laminated in one piece onto the entire surface of the substrate, a multilayer molded article (9) having a skin material laminated onto a part of a substrate can be obtained in the same manner as shown in FIG. 7.

According to the present invention, a multilayer molded article can be produced at low cost with taking advantage of the benefit of injection molding or compression molding of being capable of forming a substrate and simultaneously laminating a skin material onto the surface of the substrate, even in the case of using a skin material containing a foamed urethane layer, without impairment of the cushion property caused by crush of the foamed layer.

The present invention is illustrated by Examples below, but it is needless to say that the invention is not limited thereto.

EXAMPLE 1

Using a skin material in which a tricot (a skin layer), a 3-mm thick urethane foam with a density of 0.04 g/cm$^3$ (a foamed urethane layer) and a spunbond nonwoven polyester fabric with a weight of 70 g/m$^2$ (a backing layer) were integrated in this order by heat welding, and using a polypropylene resin (Sumitomo Noblene AZ164E-4, manufactured by Sumitomo Chemical Co., Ltd., MFR 30 g/10 minutes) as a thermoplastic resin, a multilayer molded article having a skin material laminated onto the surface of a substrate formed of the thermoplastic resin was produced by supplying the skin material to between a pair of female and male mold halves, then supplying the molten thermoplastic resin to between the skin material and the molding surface of the male mold, and thereafter clamping the mold halves in accordance with the procedures shown in FIGS. 2 to 5.

In this process, the molten thermoplastic resin was supplied to between the mold halves through a molten resin supplying opening (not shown) provided in the molding surface of the male mold via a molten resin supplying passage (not shown) provided in the male mold.

The obtained multilayer molded article had suffered from extremely less crush and had excellent appearance.

Comparative Example 1

A multilayer molded article was produced in the same manner as Example 1 except for using, as a backing layer composing a skin material, a spunbond nonwoven polyester fabric with a weight of 30 g/m$^2$.

The obtained multilayer molded article had suffered from crush of the foamed layer in the portion corresponding to the molten resin supplying opening, and had damaged cushion property and bad appearance.

EXAMPLE 2

A multilayer molded article was produced in the same manner as Example 1 except for using a 3-mm thick urethane foam with a density of 0.06 g/cm$^3$ as a foamed urethane layer.

The obtained multilayer molded article had suffered from extremely less crush and had excellent appearance.

Comparative Example 2

A multilayer molded article was produced in the same manner as Example 1 except for using a 3-mm thick urethane foam with a density of 0.06 g/cm$^3$ as a foamed urethane layer and a spunbond nonwoven polyester fabric with a weight of 30 g/m$^2$ as a backing layer.

The obtained multilayer molded article had suffered from crush of the foamed layer in the portion corresponding to the molten resin supplying opening, and had damaged cushion property and bad appearance.

What is claimed is:

1. A process for producing a multilayer molded article having a skin material laminated onto at least a part of a surface of a substrate formed of a thermoplastic resin, the process comprising supplying a skin material between a pair of mold halves, and supplying a molten thermoplastic resin between the skin material and a molding surface of one of the mold halves, wherein said skin material comprises at least a foamed urethane layer and a nonfoamed backing layer wherein the product of the density, $\rho$ (g/cm$^3$), of the foamed urethane layer and the weight, W (g/m$^2$), of the backing layer is not less than 2.

2. The process for producing a multilayer molded article according to claim 1, wherein said process is characterized by supplying said skin material between a pair of unclosed mold halves, thereafter supplying said molten thermoplastic resin between the skin material and the molding surface of one of the mold halves and clamping the mold halves to integrate the skin material with the thermoplastic resin.

3. The process according to claim 2, wherein said clamping occurs concurrently with the completion of supplying said molten thermoplastic resin.

4. The process according to claim 2, wherein said clamping occurs after supplying said molten thermoplastic resin.

5. The process according to claim 1, wherein said foamed urethane layer has a density of 0.02 to 0.08 g/cm$^3$.

6. The process according to claim 1, wherein said nonfoamed backing layer comprises at least one of a nonfoamed non-woven fabric, a sheet of synthetic resin or a film of synthetic resin.

7. A process according to claim 1, wherein said skin material comprises a woven, knit fabric or a non-woven fabric.

8. A process for controlling crush of a foamed urethane layer in a multilayer molded article including a skin material with the foamed urethane layer, the skin material being laminated onto at least a part of a surface of a substrate formed of a thermoplastic resin, wherein a backing layer is laminated to the foamed urethane layer such that the product of the density, $\rho$ (g/cm$^3$), of the foamed urethane layer and the weight, $W$ (g/m$^2$), of the backing layer is not less than 2.

9. The process according to claim 8, wherein said backing layer is laminated using heat welding to said foamed urethane layer.

10. The process according to claim 8, wherein said backing layer is laminated using an adhesive to said foamed urethane layer.

* * * * *